United States Patent
Zavesky et al.

(10) Patent No.: US 12,272,373 B2
(45) Date of Patent: Apr. 8, 2025

(54) MANAGING DIRECTED PERSONAL IMMERSIONS IN A COMMUNICATION GROUP VIA AWARENESS WARNING BASED ON LOCATION AND DIRECTIONAL POSITION

(71) Applicant: AT&T Intellectual Property I, L.P., Atlanta, GA (US)

(72) Inventors: Eric Zavesky, Austin, TX (US); Zhengyi Zhou, Chappaqua, NY (US); Mohammed Abdel-Wahab, New York, NY (US); Tan Xu, Bridgewater, NJ (US); David Gibbon, Lincroft, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 382 days.

(21) Appl. No.: 17/663,387

(22) Filed: May 13, 2022

(65) Prior Publication Data
US 2023/0368811 A1    Nov. 16, 2023

(51) Int. Cl.
*G10L 25/48* (2013.01)
*G06F 3/16* (2006.01)
(Continued)

(52) U.S. Cl.
CPC .............. *G10L 25/48* (2013.01); *G06F 3/165* (2013.01); *G06T 7/20* (2013.01); *G06T 7/70* (2017.01);
(Continued)

(58) Field of Classification Search
CPC ......... G11B 27/28; G06V 10/763; H04N 7/14
(Continued)

(56) References Cited

U.S. PATENT DOCUMENTS

| 7,298,930 B1 * | 11/2007 | Erol ................ | G11B 27/28 707/999.001 |
| 9,942,518 B1 * | 4/2018 | Tangeland .......... | G06V 10/763 |

(Continued)

FOREIGN PATENT DOCUMENTS

| JP | 2020-088516 | * | 6/2020 | |
| SE | 2953351 | * | 7/2019 | ............... H04N 7/14 |

OTHER PUBLICATIONS

Palazzo et al., U.S. Appl. No. 17/541,030, filed Dec. 2, 2021, 46 pages.

*Primary Examiner* — Farzad Kazeminezhad (57) ABSTRACT

In one example, a method performed by a processing system including at least one processor includes establishing a communication group including at least three users of an extended reality environment as members, tracking locations and directional positions of the members of the communication group within the extended reality environment and within physical environments of the members, determining that a second user of the at least three users is an intended recipient of a first utterance made by a first user of the at least three users, and presenting the first utterance to the second user, where a directionality associated with a presentation of the first utterance is based on a location and a directional position of the first user relative to the second user, and presenting a spatial awareness warning to the second user, based on the location and the directional position of the second user.

20 Claims, 3 Drawing Sheets

(51) Int. Cl.
    *G06T 7/20*         (2017.01)
    *G06T 7/70*         (2017.01)
    *G10L 13/02*       (2013.01)
    *G10L 15/22*       (2006.01)
    *G11B 27/28*       (2006.01)
    *H04N 7/14*        (2006.01)
    *H04N 7/15*        (2006.01)

(52) U.S. Cl.
    CPC .............. *G10L 13/02* (2013.01); *G10L 15/22* (2013.01); *G06T 2207/30196* (2013.01)

(58) Field of Classification Search
    USPC ...................................... 707/999.01; 704/271
    See application file for complete search history.

(56) References Cited

U.S. PATENT DOCUMENTS

2016/0140321 A1*   5/2016   Bowers .................... A61B 5/16
                                                                 704/271
2020/0349768 A1    11/2020   Zavesky et al.

* cited by examiner

FIG. 3 ated with a presentation of the first utterance is based on a location and a directional position of the first user relative to the second user.

In another example, a device includes a processing system including at least one processor and a computer-readable medium storing instructions which, when executed by the processing system, cause the processing system to perform operations. The operations include establishing a communication group including at least three users of an extended reality environment as members, tracking locations and directional positions of the members of the communication group within the extended reality environment and within physical environments of the members, determining that a second user of the at least three users is an intended recipient of a first utterance made by a first user of the at least three users, and presenting the first utterance to the second user, where a directionality associated with a presentation of the first utterance is based on a location and a directional position of the first user relative to the second user.

MANAGING DIRECTED PERSONAL IMMERSIONS IN A COMMUNICATION GROUP VIA AWARENESS WARNING BASED ON LOCATION AND DIRECTIONAL POSITION

The present disclosure relates generally to extended reality (XR) systems, and relates more particularly to devices, non-transitory computer-readable media, and methods for managing directed personal immersions.

BACKGROUND

Extended reality (XR) is an umbrella term that has been used to refer to various different forms of immersive technologies, including virtual reality (VR), augmented reality (AR), mixed reality (MR), cinematic reality (CR), and diminished reality (DR). Generally speaking, XR technologies allow virtual world (e.g., digital) objects from the metaverse to be brought into "real" (e.g., non-virtual) world environments and real world objects to be brought into virtual environments, e.g., via overlays or other mechanisms. Within this context, the term "metaverse" is typically used to describe the convergence of a virtually enhanced physical reality and a persistent virtual space, e.g., a physically persistent virtual space with persistent, shared, three-dimensional virtual spaces linked into a perceived virtual universe. XR technologies may have applications in fields including architecture, sports training, medicine, real estate, gaming, television and film, engineering, travel, and others. As such, immersive experiences that rely on XR technologies are growing in popularity.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

SUMMARY

In one example, the present disclosure describes a device, computer-readable medium, and method for managing personal immersions in extended reality environments using spatial directions and contextual engagements. For instance, in one example, a method performed by a processing system including at least one processor includes establishing a communication group including at least three users of an extended reality environment as members, tracking locations and directional positions of the members of the communication group within the extended reality environment and within physical environments of the members, determining that a second user of the at least three users is an intended recipient of a first utterance made by a first user of the at least three users, and presenting the first utterance to the second user, where a directionality associated with a presentation of the first utterance is based on a location and a directional position of the first user relative to the second user.

In another example, a non-transitory computer-readable medium stores instructions which, when executed by a processing system, including at least one processor, cause the processing system to perform operations. The operations include establishing a communication group including at least three users of an extended reality environment as members, tracking locations and directional positions of the members of the communication group within the extended reality environment and within physical environments of the members, determining that a second user of the at least three users is an intended recipient of a first utterance made by a first user of the at least three users, and presenting the first utterance to the second user, where a directionality associ- In one example, the present disclosure manages personal immersions in extended reality environments using spatial directions and contextual engagements. As discussed above, XR technologies allow virtual world (e.g., digital) objects from the metaverse to be brought into "real" (e.g., non-virtual) world environments and real world objects to be brought into virtual environments, e.g., via overlays in a display, projection, hologram, or other mechanisms. This creates a more engaging and immersive experience for users. For instance, multiple users could join the same XR environment, such as an immersive multiplayer game, a virtual tour of a famous landmark, or a virtual meeting, from different physical locations, but the XR environment could be configured to make the users "feel" as if they are together in the same physical location.

Advancements in XR technology have allowed audio and video to be spatially projected into regions around a user without requiring the user to be encumbered by hardware that must be worn or carried, such as head mounted displays. Ambient audio and visual techniques are improving in capability and can be intelligently honed for individual experiences. However, difficulty remains in directing audio and video for a user who is simultaneously involved in multiple different interactions within an XR environment, or even in a single interaction with multiple other people. Localization methods (e.g., tags, positional triangulation for cellular base stations, etc.) tend to be disjoint, and further cues (e.g., gaze, audio, cadence, context) are often needed in order to determine the individual being addressed by a statement. In some cases, however, the directed immersion techniques may not be sufficient to process these further cues.

For instance, a user and a family member may both be involved in a conversation via virtual meeting with a technician who is repairing the family member's computer. In a face to face interaction, when the user asks a question about repairs, there would typically be visual cues to indicate to the participants that the user is addressing the technician and not the family member. In an extended reality interaction, however, audio segregation and directed immersion techniques might not be capable of understanding the dialogue or specific contexts and, thus, would not know to direct the user's question about "repairs" to the technician rather than to the family member.

Additionally, some techniques might not be well suited to maintaining the privacy of interactions across multiple changing physical (or real world) environments (e.g., inside a car, inside a building, outside, on a train or bus, etc.). For instance, a user's physical environment may change while they continue to participate in the same extended reality environment, and privacy for the immersion as a whole as well as for directed interactions with other users within the immersion may be desired even though some of these physical environments may be public.

Examples of the present disclosure provide a system that improves the management of personal immersions in extended reality environments using spatial directions and contextual engagements. In one example, conversations in an extended reality environment may be tracked and localized to infer direction, and the extended reality environment may be rendered (e.g., audio and video presentation may be directed) to help orient users appropriately based in the inferred direction. Communication and immersions between different groups of people can be established and maintained as group membership changes (e.g., people are added or removed from a group) and as the members move within their physical (real world) environments. In further examples, positional triangulation (e.g., from cellular base stations and/or mobile devices) can be enhanced using cues such as gaze, audio, cadence, and context to determine and direct the conversations and immersions. In further examples still, the privacy of the conversations and immersions may be maintained as members of the groups transition between different physical environments. These and other aspects of the present disclosure are described in greater detail below in connection with the examples of FIGS. 1-3.

Figure 1:
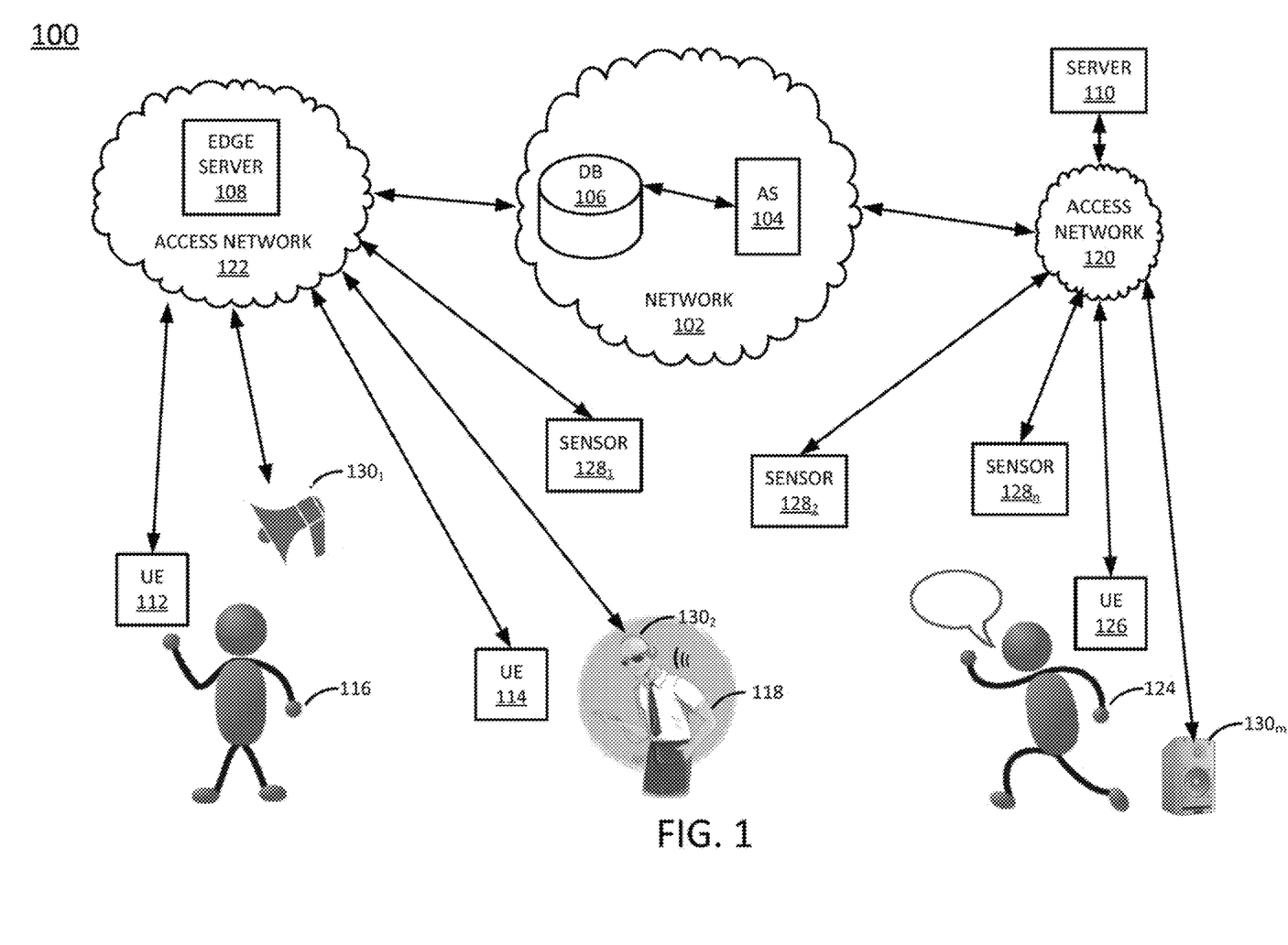
FIG. 1 illustrates an example system in which examples of the present disclosure may operate.

To further aid in understanding the present disclosure, FIG. 1 illustrates an example system 100 in which examples of the present disclosure may operate. The system 100 may include any one or more types of communication networks, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, 5G and the like related to the current disclosure. It should be noted that an IP network is broadly defined as a network that uses Internet Protocol to exchange data packets. Additional example IP networks include Voice over IP (VoIP) networks, Service over IP (SoIP) networks, and the like.

In one example, the system 100 may comprise a network 102, e.g., a telecommunication service provider network, a core network, or an enterprise network comprising infrastructure for computing and communications services of a business, an educational institution, a governmental service, or other enterprises. The network 102 may be in communication with one or more access networks 120 and 122, and the Internet (not shown). In one example, network 102 may combine core network components of a cellular network with components of a triple play service network; where triple-play services include telephone services, Internet or data services and television services to subscribers. For example, network 102 may functionally comprise a fixed mobile convergence (FMC) network, e.g., an IP Multimedia Subsystem (IMS) network. In addition, network 102 may functionally comprise a telephony network, e.g., an Internet Protocol/Multi-Protocol Label Switching (IP/MPLS) backbone network utilizing Session Initiation Protocol (SIP) for circuit-switched and Voice over internet Protocol (VoIP) telephony services. Network 102 may further comprise a broadcast television network, e.g., a traditional cable provider network or an internet Protocol Television (IPTV) network, as well as an Internet Service Provider (ISP) network. In one example, network 102 may include a plurality of television (TV) servers (e.g., a broadcast server, a cable head-end), a plurality of content servers, an advertising server (AS), an interactive TV/video on demand (VoD) server, and so forth.

In one example, the access networks 120 and 122 may comprise broadband optical and/or cable access networks, Local Area Networks (LANs), wireless access networks (e.g., an IEEE 802.11/Wi-Fi network and the like), cellular access networks, Digital Subscriber Line (DSL) networks, public switched telephone network (PSTN) access networks, 3rd party networks, and the like. For example, the operator of network 102 may provide a cable television service, an IPTV service, or any other types of telecommunication service to subscribers via access networks 120 and 122. In one example, the access networks 120 and 122 may comprise different types of access networks, may comprise the same type of access network, or some access networks may be the same type of access network and others may be different types of access networks. In one example, the network 102 may be operated by a telecommunication network service provider. The network 102 and the access networks 120 and 122 may be operated by different service providers, the same service provider or a combination thereof, or may be operated by entities having core businesses that are not related to telecommunications services, e.g., corporate, governmental or educational institution LANs, and the like.

Figure 3:
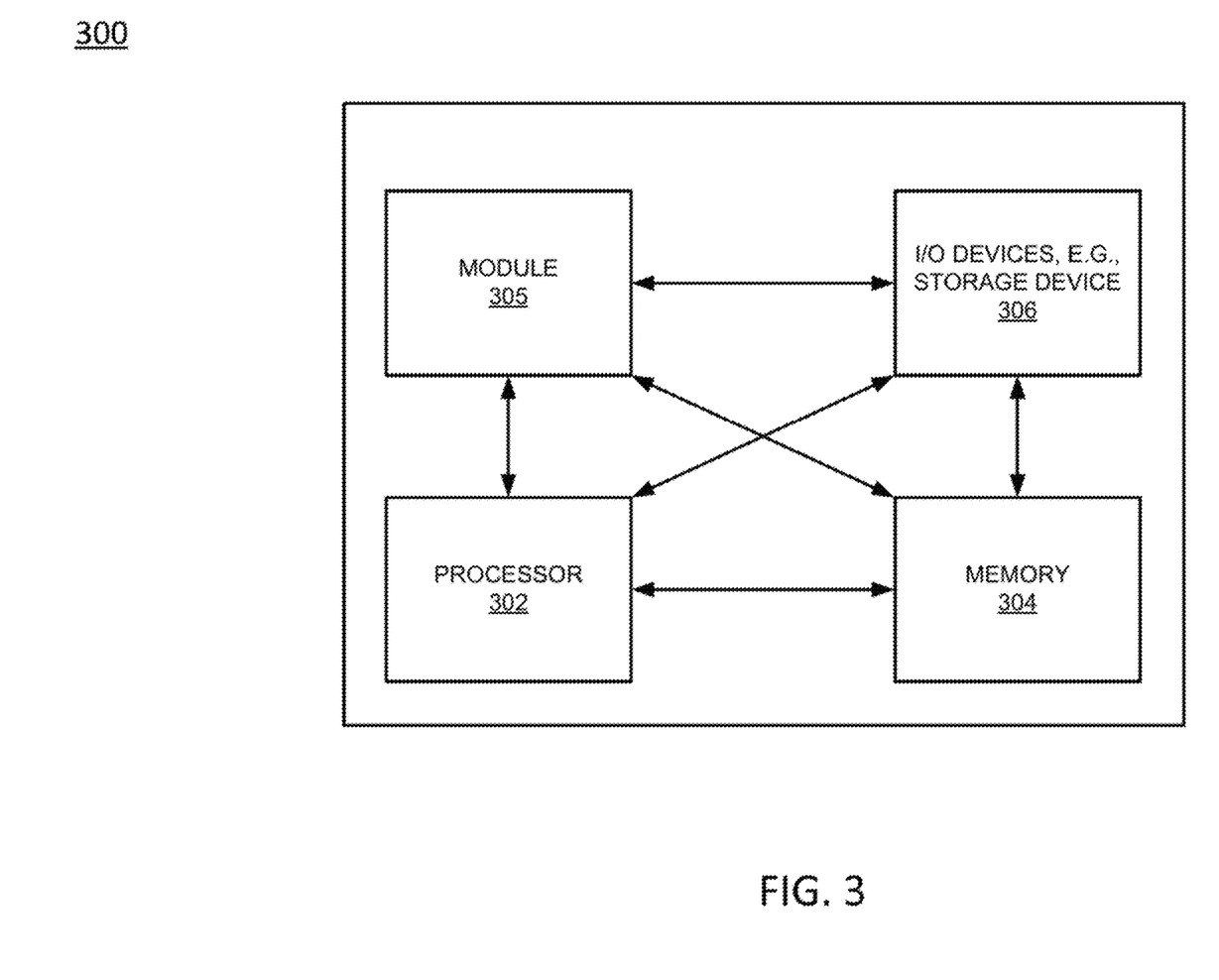
FIG. 3 depicts a high-level block diagram of a computing device specifically programmed to perform the functions described herein.

In accordance with the present disclosure, network 102 may include an application server (AS) 104, which may comprise a computing system or server, such as computing system 300 depicted in FIG. 3, and may be configured to provide one or more operations or functions in connection with examples of the present disclosure for managing personal immersions in extended reality environments using spatial directions and contextual engagements. The network 102 may also include one or more databases (DBs) 106 that are communicatively coupled to the AS 104. For instance, the DB(s) 106 may store virtual items for use in extended reality environments, user profiles associated with users of extended reality environments, information concerning the locations, access privileges, and capabilities of one or more sensors and one or more audio devices, and other information, as discussed in greater detail below.

It should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device including one or more processors, or cores (e.g., as illustrated in FIG. 3 and discussed below) or multiple computing devices collectively configured to perform various steps, functions, and/or operations in accordance with the present disclosure. Thus, although only a single application server (AS) 104 and single database (DB) 106 are illustrated, it should be noted that any number of servers and any number of databases may be deployed. Furthermore, these servers and databases may operate in a distributed and/or coordinated manner as a processing system to perform operations in connection with the present disclosure.

In one example, AS 104 may comprise a centralized network-based server for generating extended reality environments. For instance, the AS 104 may host an application that renders immersive extended reality environments which are accessible by users utilizing various user endpoint devices, e.g., user endpoint devices (UEs) 112, 114, and 126. In one example, the AS 104 may be configured to establish communication groups between a plurality of users (e.g., users 116, 118, and 124) of an extended reality environment. In the examples described below, a communication group includes at least three users; however, in other examples, a communication group may include as few as two users. The AS 104 may be in communication with a plurality of sensors (e.g., sensors $128_1$-$128_n$, hereinafter individually referred to as a "sensor 128" or collectively referred to as "sensors 128") that are distributed throughout the physical, real world environments from which the plurality of users join the extended reality environment.

For instance, in one example, the sensors 128 may include ambient sensors located in the members' physical environments, such as cameras, microphones, radio frequency identification, motion sensors, or the like. In some examples, the sensors 128 may include ultra-wideband (UWB) tags or the like which may be associated with known reference points in a physical environment. At least some of the ambient sensors 128 may have known fixed positions within the physical environment; however, in some examples, some of the sensors 128 may also have movable positions (e.g., drones). In further examples, the sensors 128 may include sensors that are integrated in the users' user endpoint devices (e.g., UEs 112, 114, and 126). The sensors may provide sensor data such as images, audio, global positioning system coordinates, or other data to the AS 104. The AS 104 may use the sensor data to detect and track the locations of the users' within their physical environments and to track the positions and directional relationships of the users relative to each other.

The AS 104 may further detect utterances made by users within a communication group and may infer the intended recipient(s) of the utterances based on context and/or physical cues (e.g., gaze, cadence, etc.). The AS 104 may control one or more audio devices (e.g., audio devices $130_1$-$130_m$, hereinafter individually referred to as an "audio device 130" or collectively referred to as "audio devices 130") within the physical environment of the intended recipient in order to play the utterance so that the intended recipient perceives the utterance as emanating from a directionality associated with the speaker of the utterance. For instance, if an avatar of the speaker is positioned in front of the intended recipient within the extended reality environment, then the AS 104 may control an audio device 130 to play the utterance such that the utterance is perceived by the intended recipient as emanating from in front of him of her. If the avatar of the speaker is far away from the intended recipient, then the AS 104 may control an audio device 130 to play the utterance at a lower volume such that the utterance is perceived by the intended recipient as coming from a distance. In one example, the audio devices 130 may include ambient audio devices within the physical environments (e.g., speakers systems such as audio device $130_m$, public address systems such as audio device $130_1$, displays with integrated speakers, etc.). In a further example, the audio devices 130 may also include user endpoint devices belonging to the intended recipient (e.g., earbuds or headphones such as audio device $130_2$, smart glasses with integrated speakers, etc.).

Without loss of generality, in another example, the audio devices 130 may also include video devices to capture (e.g., cameras) or deliver (e.g., displays, projectors) the interactions of the UEs 112, 114, and 126. In this context, the captured "utterance" may comprise a facial expression (e.g., a smile, a wink, a nod, etc.) or a gesture (e.g., thumbs up, head shake, moving closer to an immersion object, etc.). Thus, although examples of the present disclosure may be described within the context of spoken or audible utterances, the same concepts could also be applied to physical or visible gestures. In yet another example, additional sensors and physical actuators may be employed to engage other modalities such as olfactory and tactile interactions (in terms of both the capture and the digital transmission or playback of these interactions within the shared immersion).

In one example, AS 104 may comprise a physical storage device (e.g., a database server) to store virtual items. The virtual items may comprise both immersive and non-immersive items of media content, such as still images, video (e.g., two dimensional video, three-dimensional video, 360 degree video, volumetric video, etc.), audio, three-dimensional models, and the like. The virtual items may comprise items that the AS 104 may insert into the extended reality environment.

The AS 104 may also store the locations and/or orientations of one or more sensors, such as the sensors 128. For instance, as discussed above, at least some of the sensors 128 may have fixed positions and/or orientations. The positions and/or orientations of the sensors 128 may be stored by the AS 104 (e.g., as an index) and used to track the locations of the users of the extended reality environment (e.g., by correlating data received from the sensors 128 to the known positions and/or orientations of the sensors. For instance, the AS 104 may be able to determine the location of a particular user based on an image of the particular user being captured by a camera having a known location. If the orientation of the camera is also known, the AS 104 may also be able to determine the direction in which the user is positioned or gazing.

The AS 104 may also store user profiles for users of the extended reality environment. The user profiles may include, for example, images and/or audio of the users (which may help in identifying users depicted in sensor data), identifiers for and capabilities of user endpoint devices used by the users to connect to the extended reality environment, preferences of the users (e.g., whether the AS 104 is permitted to control the audio of the user's user endpoint devices, whether the user preferences to have certain types of audio content filtered, etc.), interests of the user (e.g., hobbies, favorite sports teams or movies, etc.), contacts of the user, and/or other information.

In one example, one or more of the DBs 106 may store the virtual items, the known locations and/or orientations of the sensors, and/or the user profiles and the AS 104 may retrieve the virtual items, the known locations and/or orientations of the sensors, and/or the user profiles from the DB(s) 106 when needed. For ease of illustration, various additional elements of network 102 are omitted from FIG. 1.

Figure 2:
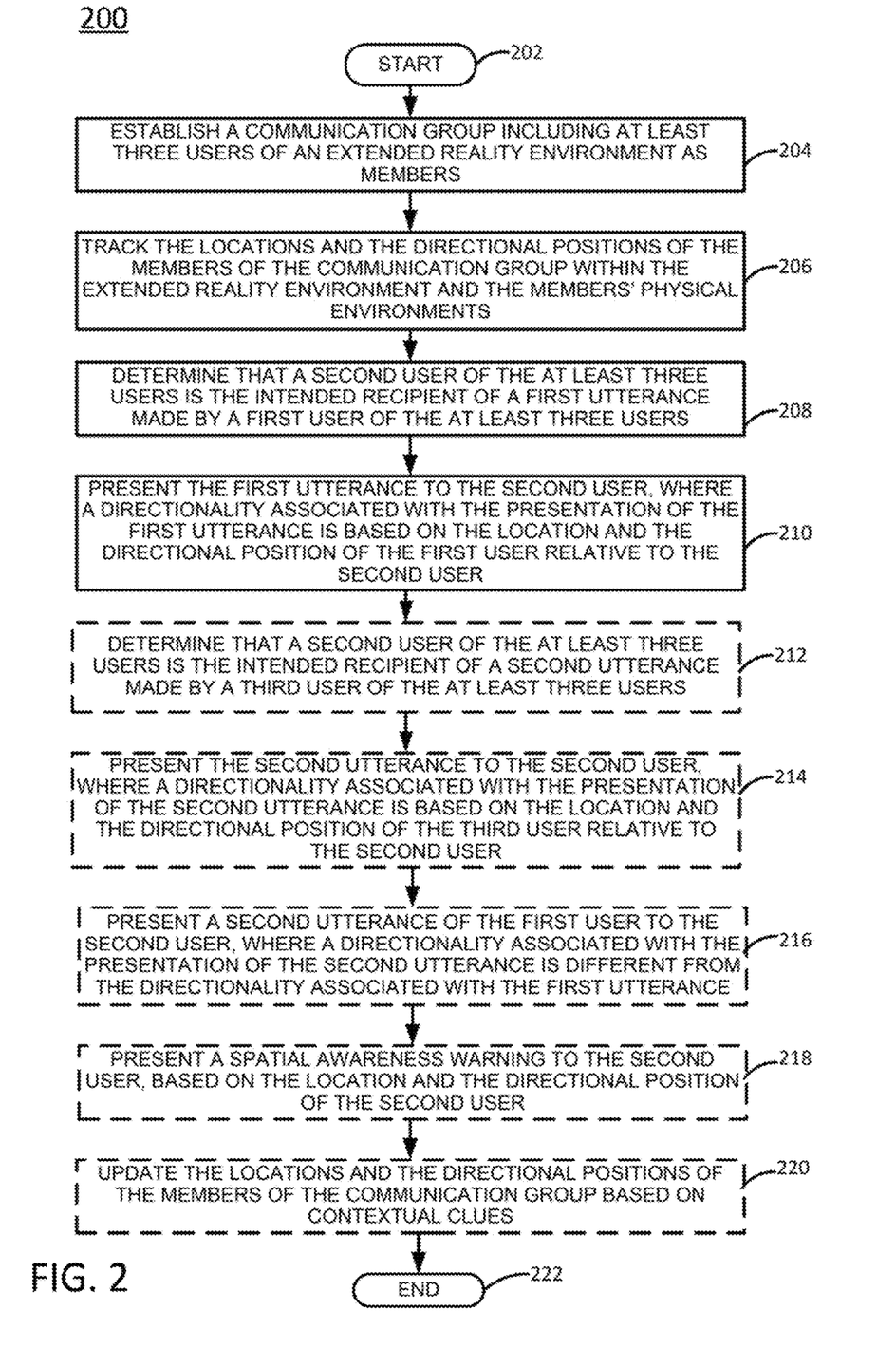
FIG. 2 illustrates a flowchart of an example method for managing directed personal immersions in accordance with the present disclosure.

In one example, access network 122 may include an edge server 108, which may comprise a computing system or server, such as computing system 300 depicted in FIG. 3, and may be configured to provide one or more operations or functions for managing personal immersions in extended reality environments using spatial directions and contextual engagements, as described herein. For instance, an example method 200 for managing personal immersions in extended reality environments using spatial directions and contextual engagements is illustrated in FIG. 2 and described in greater detail below.

In one example, application server 104 may comprise a network function virtualization infrastructure (NFVI), e.g., one or more devices or servers that are available as host devices to host virtual machines (VMs), containers, or the like comprising virtual network functions (VNFs). In other words, at least a portion of the network 102 may incorporate software-defined network (SDN) components.

Similarly, in one example, access networks 120 and 122 may comprise "edge clouds," which may include a plurality of nodes/host devices, e.g., computing resources comprising processors, e.g., central processing units (CPUs), graphics processing units (GPUs), programmable logic devices (PLDs), such as field programmable gate arrays (FPGAs), or the like, memory, storage, and so forth. In an example where the access network 122 comprises radio access networks, the nodes and other components of the access network 122 may be referred to as a mobile edge infrastructure. As just one example, edge server 108 may be instantiated on one or more servers hosting virtualization platforms for managing one or more virtual machines (VMs), containers, microservices, or the like. In other words, in one example, edge server 108 may comprise a VM, a container, or the like.

In one example, the access network 120 may be in communication with a server 110. Similarly, access network 122 may be in communication with one or more devices, e.g., user endpoint device 112 and user endpoint device 114, and access network 120 may be in communication with one or more devices, e.g., a user endpoint device 126. Access network 122 may also be in communication with one or more ambient sensors distributed throughout a physical environment and one or more audio devices distributed throughout a physical environment, e.g., sensor 128$_1$ and audio devices 130$_1$ and 130$_2$, while access network 120 may be in communication with one or more ambient sensors distributed throughout a physical environment and one or more audio devices distributed throughout a physical environment, e.g., sensors 128$_2$ and 128$_n$ and audio device 130$_m$.

Access networks 120 and 122 may transmit and receive communications between server 110, user endpoint devices 112 and 114, application server (AS) 104, sensors 128, audio devices 130, other components of network 102, devices reachable via the Internet in general, and so forth. In one example, the user endpoint devices 112, 114, and 126 may comprise mobile devices, cellular smart phones, wearable computing devices (e.g., smart glasses, virtual reality (VR) headsets or other types of head mounted displays, or the like), laptop computers, tablet computers, Internet of Things (I) devices, or the like (broadly "extended reality devices"). In one example, each of user endpoint devices 112, 114, and 126 may comprise a computing system or device, such as computing system 300 depicted in FIG. 3, and may be configured to provide one or more operations or functions in connection with examples of the present disclosure for managing personal immersions in extended reality environments using spatial directions and contextual engagements.

In one example, server 110 may comprise a network-based server for generating extended reality environments. In this regard, server 110 may comprise the same or similar components as those of AS 104 and may provide the same or similar functions. Thus, any examples described herein with respect to AS 104 may similarly apply to server 110, and vice versa. In particular, server 110 may be a component of an extended reality system operated by an entity that is not a telecommunications network operator. For instance, a provider of an extended reality system may operate server 110 and may also operate edge server 108 in accordance with an arrangement with a telecommunication service provider offering edge computing resources to third-parties. However, in another example, a telecommunication network service provider may operate network 102 and access network 122, and may also provide an extended reality system via AS 104 and edge server 108. For instance, in such an example, the extended reality system may comprise an additional service that may be offered to subscribers, e.g., in addition to network access services, telephony services, traditional television services, and so forth.

In an illustrative example, an extended reality system may be provided via AS 104 and edge server 108. In one example, users may engage an application on user endpoint devices 112 and 114 (e.g., "extended reality devices") to establish one or more sessions with the extended reality system, e.g., connections to edge server 108 (or connections to edge server 108 and a connection to AS 104). In one example, the access network 122 may comprise a cellular network (e.g., a 4G network and/or an LTE network, or a portion thereof, such as an evolved Uniform Terrestrial Radio Access Network (eUTRAN), an evolved packet core (EPC) network, etc., a 5G network, etc.). Thus, the communications between user endpoint devices 112 and 114 and edge server 108 may involve cellular communication via one or more base stations (e.g., eNodeBs, gNBs, or the like). However, in another example, the communications may alternatively or additional be via a non-cellular wireless communication modality, such as IEEE 802.11/Wi-Fi, or the like. For instance, access network 122 may comprise a wireless local area network (WLAN) containing at least one wireless access point (AP), e.g., a wireless router. Alternatively, or in addition, user endpoint devices 112 and 114 may communicate with access network 122, network 102, the Internet in general, etc., via a WLAN that interfaces with access network 122.

In the example of FIG. 1, user endpoint devices 112 and 114 may establish sessions with edge server 108 for accessing or joining or generating an extended reality environment that requires heavy computational or graphical resources beyond the hardware capacity of the user endpoint devices 112 and 114 for low network latency. Similarly, user endpoint device 126 may establish a session with AS 104 or server 110 for accessing or joining the extended reality environment. As discussed above, the extended reality environment may be generated by combining virtual elements with elements of a real world location. The extended reality environment may, for instance, provide an environment (e.g., a virtual tour, a virtual performance, a virtual meeting, or the like) that multiple users can join from different physical locations and yet still "feel" as if they are sharing a common virtual space.

The AS 104 may group users of the extended reality environment into different communication groups. For instance, users 116, 118, and 124 may all belong to a common communication group. Within the communication group, the AS 104 may detect the intended recipients of utterances spoken by users 116, 118, and 124 and may control the selection and output directionality of audio devices in order such that an intended recipient perceives an utterance as coming from a perceived direction of the speaker of the utterance. For example, the AS 104 may determine that user 118 is the intended recipient of an utterance spoken by user 124. Moreover, by tracking the locations of the users 116, 118, and 124, the AS 104 may determine that the user 124 is located six feet to the left of user 118. Thus, the AS 104 may select an audio device, e.g., the headphones $130_2$ of the user 118, to play the utterance of the user 124 for the user 118. The AS 104 may control the directionality of the output of the audio device such that the user 118 perceives the utterance as emanating from six feet to their left. For instance, the utterance may be played only over the left output of the headphones $130_2$ and not over the right output, and the volume of the left output may be controlled to sound as if the utterance is emanating from approximately six feet away. If the utterance is determined to be part of a private conversation between the user 118 and the user 124, then no audio device may be selected to play the utterance for the user 116.

It should also be noted that the system 100 has been simplified. Thus, it should be noted that the system 100 may be implemented in a different form than that which is illustrated in FIG. 1, or may be expanded by including additional endpoint devices, access networks, network elements, application servers, etc. without altering the scope of the present disclosure. In addition, system 100 may be altered to omit various elements, substitute elements for devices that perform the same or similar functions, combine elements that are illustrated as separate devices, and/or implement network elements as functions that are spread across several devices that operate collectively as the respective network elements. For example, the system 100 may include other network elements (not shown) such as border elements, routers, switches, policy servers, security devices, gateways, a content distribution network (CDN) and the like. For example, portions of network 102, access networks 120 and 122, and/or Internet may comprise a content distribution network (CDN) having ingest servers, edge servers, and the like for packet-based streaming of video, audio, or other content. Similarly, although only two access networks, 120 and 122 are shown, in other examples, access networks 120 and/or 122 may each comprise a plurality of different access networks that may interface with network 102 independently or in a chained manner. In addition, as described above, the functions of AS 104 may be similarly provided by server 110, or may be provided by AS 104 in conjunction with server 110. For instance, AS 104 and server 110 may be configured in a load balancing arrangement, or may be configured to provide for backups or redundancies with respect to each other, and so forth. Thus, these and other modifications are all contemplated within the scope of the present disclosure.

To further aid in understanding the present disclosure, FIG. 2 illustrates a flowchart of an example method 200 for managing directed personal immersions in accordance with the present disclosure. In particular, the method 200 provides a method by which an extended reality environment may be rendered and conversations between different groups of users within the extended reality environment can be directed appropriately and in a manner that maintains privacy. In one example, the method 200 may be performed by an XR server that is configured to generate XR environments, such as the AS 104 or server 110 illustrated in FIG. 1. However, in other examples, the method 200 may be performed by another device, such as the processor 302 of the system 300 illustrated in FIG. 3. For the sake of example, the method 200 is described as being performed by a processing system.

The method 200 begins in step 202. In step 204, the processing system may establish a communication group including at least three users of an extended reality environment as members. In one example, the extended reality environment may comprise an immersive game, a real estate simulator, a training simulator, a virtual tour of a space (e.g., a museum or landmark), a navigation application, a virtual meeting, a virtual class, a virtual conference, a virtual performance (e.g., theater, concert, sporting event, etc.), or any other immersive experience.

As described above, in one example, the first communication group includes at least three users as members, e.g., a first user, a second user, and a third user. The communication group may include any number of users of the extended reality environment, however, and thus may include additional users of the extended reality environment as well. The at least three users may be users of the extended reality environment who are communicating with each other (e.g., sharing a conversation). In one example, any of the at least three users may belong to more than one communication group in the extended reality environment. For instance, the first user may be communicating with two or more different groups of users in the extended reality environment (e.g., a first communication group and a second communication group).

In one example, the communication group may be established through observation of a direct communication between the at least three users (e.g., exchange of verbal/audio communications, text-based messages such as email, short messaging service, or in-application messaging within the extended reality environment, or the like), through observation of gestures of the at least three users (e.g., gestures that are mapped to operations that control membership in a communication group, such as clicking or tapping on another's user's avatar to add or remove the other user from a communication group), through observation of automated calendars of the at least three users (e.g., an observation that the first user has a virtual meeting scheduled with the second user and the third user on a specific date and at a specific time), or through an observation that the at least three users are within physical proximity of each other (e.g., either within the extended reality environment or in a physical real world environment).

In another example, the communication group may be established by roles, responsibilities, or needs of users who are in a related function and/or context. In the context of differing roles, one or more users in a supervisory role may be connected to other users as direct employees. In a responsibility context, operators of certain machinery may be connected to educators or support members who understand and provide information about the safe operation of that machinery. In a functional context example, one user may be a commuter using public transportation, and secondary users may include emergency personnel who were opportunistically selected by an emergency routing system to provide support after the first user sustained injuries from a passing bus.

In another example, the first communication group may be established through observation of an existing communication group or social group being split. For instance, the processing system may observe that the members of the communication group were riding a train together, but that two members of the communication group got off the train at the same stop while the other members of the communication group remained on the train. In this case, the processing system may split the communication group into a first communication group only for the members of the original communication group who remained on the train and a second communication group only for the members of the original communication group who got off of the train. Additionally, the original communication group may be maintained. Thus, a user who belonged to the original communication group may now belong to at least two communication groups: the original communication group, plus one of the first communication group or the second communication group (depending on whether the user remained on the train or got off).

In one example, establishing the communication group involves selecting one or more audio devices through which communications between members of the communication group can be presented. For instance, in one example, communications may be presented through ambient audio equipment within the at least three users' vicinity (e.g., speakers, microphones, devices including integrated speakers and/or microphones, etc.). Continuing the example of the train above, ambient audio equipment might include a public address system of the train. In another example, at least some users of the at least three users may provide permission for the processing system to access the users' personal audio equipment of the user (e.g., any user endpoint device that includes a speaker and/or microphone). Continuing the example of the train above, the personal audio equipment might include a user's Bluetooth ear buds or smart glasses. In one example, the one or more audio devices are permitted to receive telemetry for directional operations, as discussed in greater detail below.

In step 206, the processing system may track the locations and the directional positions of the members of the communication group (i.e., the at least three users) within the extended reality environment and the members' physical (real world) environments. In one example, the locations and directional positions may be tracked through ambient sensors located in the members' physical environments (e.g., cameras, microphones, radio frequency identification, motion sensors, or the like). In some examples, these sensors may include ultra-wideband (UWB) tags or the like which may be associated with known reference points in a physical environment. For instance, a user's location and directional position could be tracked through a series of images captured by cameras having known fixed locations, or a camera on a drone whose coordinates are tracked. A user's location and directional position could also be estimated from audio of utterances spoken by the user (e.g., based on the amplitude of the audio and the known position of the microphone that captured the audio).

In another example, the processing system may track the location of the members' user endpoint devices (e.g., mobile phones, tablet computers, etc.) based on signals exchanged between the devices and other equipment for wireless and data transmissions, such as directional communications, beam forming from 5G devices, and the like.

In step 208, the processing system may determine that a second user of the at least three users is an intended recipient of a first utterance made by a first user of the at least three users. In one example, the second user may be the only intended recipient of the first utterance; however, in other examples, other users of the at least three users may also be intended recipients of the first utterance. Within this context, an "intended recipient" of an utterance is understood to refer to a user to whom the utterance is directed.

In one example, the intended recipient may be determined in accordance with a context of the first utterance. For instance, the processing system may apply speech recognition and natural language understanding techniques in order to detect conversation topics within the communications (e.g., utterances and/or other communications) exchanged between the at least three users. Then, when the first utterance of the first user is spoken, the processing system may apply similar techniques to understand the intent of the first utterance (e.g., how the first utterance fits into a detected conversation topic), and may then infer the intended recipient from the intent of the first utterance. As an example, the first user may utter, "John, which train station are you getting off at?" Using speech recognition and natural language understanding techniques, the processing system may infer that John is the intended recipient of this utterance.

However, in other examples, the intended recipient may not be so explicitly stated in the first utterance, and the processing system may rely on other contextual clues to infer the intended recipient. For instance, if the first communication group comprises a family member of the first user and a technician who is repairing a computer belonging to the family member, the first user may say, "How long are the repairs expected to take?" In this example, the processing system may infer that the intended recipient of the utterance is the technician, since the context of the utterance comprises a question that the technician, but not the family member, would be expected to know. Similarly, if the first user says, "You can use my computer until the repairs are done," the processing system may infer that the intended recipient of the utterance is the family member, since the conversation has established that the family member's computer will be unavailable while the repairs are being made.

In this example, the processing system may have knowledge of the roles and relationships of the at least three users that may help the processing system to infer the intended recipient from the context. The knowledge of these roles and relationships may be inferred from previous communications exchanged by the at least three users (e.g., the technician introducing themselves, the first user identifying themselves to the technician as the family member of the user whose computer is being repaired, etc.). In another example, the knowledge of these roles and relationships may be inferred from user profiles associated with the at least three users. For instance, the technician's user profile may identify their occupation as a "computer support specialist," or the first user's user profile may indicate that frequent contacts of the first user include the first user's family member (and may identify the specific relationship of the family member, e.g., parent, sibling, etc.).

In some examples, determining that the second user is an intended recipient of the first utterance made by a first user may include one or more pre-processing techniques prior to applying any speech recognition, natural language understanding, or other techniques. For instance, the processing system may apply techniques such as reduction of ambient sound, noise cancellation, and the like, in order to make it easier to apply subsequent speech recognition and natural language processing.

In step 210, the processing system may present the first utterance to the second user, where a directionality associated with the presentation of the first utterance is based on the location and the directional position of the first user relative to the second user (e.g., as determined in accordance with the tracking of step 206). In other words, presentation of the first utterance as directed to the second user considers a spatial reference of the first user relative to the second user.

In one example, presentation of the first utterance may involve controlling ambient audio devices in the second user's physical environment to present the first utterance. In other examples, presentation of the first utterance may involve controlling one or more user endpoint devices of the second user to present the first utterance, if the second user has granted the processing system permission to access the user endpoint device(s). The selection of the device to present the first utterance may be based on the capabilities of the available devices (e.g., abilities to adjust volume and/or directional projection), the locations of the available devices, and/or other considerations.

In one example, the presentation of the first utterance may involve playing the first utterance in a manner that causes the second user to perceive that the first user is positioned in a specific location relative to the second user. For instance, if the first user is positioned to the second user's left hand side in the extended reality environment, then the first utterance may be presented in a manner that makes it sound as if the first utterance is coming from the second user's left hand side. For instance, the volume of the left earbud of the second user's Bluetooth earbuds may be adjusted to be louder than the volume of the right earbud, or an ambient speaker on the second user's left hand side may be used to present the first utterance. Thus, playing the first utterance in a manner that causes the second user to perceive that the first user is positioned in a specific location relative to the second user may involve selecting an audio device with a specific location to play the first utterance and/or controlling a volume at which the selected audio device plays the first utterance.

In a further example, playing the first utterance in a manner that causes the second user to perceive that the first user is positioned in a specific location relative to the second user may consider movements of the second user as well as the first user. For instance, if the second user is detected to be leaning toward the first user, then the volume of the first utterance may be increased to reflect the second user's movements.

In a further example, playing the first utterance in a manner that causes the second user to perceive that the first user is positioned in a specific location relative to the second user may include applying audio cancellation, noise reduction, or other techniques to other audio signals (i.e., audio signals other than the utterance) in the second user's vicinity. For instance, if the extended reality environment comprises a virtual concert, the volume of the music may be lowered to allow the second user to better hear the first user.

In one example, the processing system may tailor the presentation of the first utterance to the capabilities of the audio devices in the second user's vicinity. For instance, if the processing system determines that a volume of the first utterance should be lower on the right side of the second user than on the left side of the second user, then selection of the audio device to play the first utterance may depend on which audio devices in the second user's vicinity have adjustable volume controls. In another example, selection of the audio device to play the first utterance may be tailored to the connectivity (e.g., signal strength, bandwidth, latency, etc.) of the audio devices in the second user's vicinity.

In optional step 212 (illustrated in phantom), the processing system may determine that the second user is an intended recipient of a second utterance made by a third user of the at least three users (different from the first user). Determining that the second user is an intended recipient of a second utterance may be performed in accordance with any of the techniques discussed above in connection with step 208. In this example, the third user is a different user than the first user.

In optional step 214 (illustrated in phantom), the processing system may present the second utterance to the second user, where a directionality associated with the presentation of the second utterance is based on the location and the directional position of the third user relative to the second user (e.g., as determined in accordance with the tracking of step 206). Presentation of the second utterance may be made in any of the manners discussed above with reference to the first utterance of step 210. However, in this example, because the second utterance is being spoken by a third user, different from the first user, the directionality associated with the presentation of the second utterance will be different from the directionality associated with the presentation of the first utterance. For instance, if the first user is located on the second user's right, and the third user is located on the second user's left, then the first utterance and the second utterance may be presented so that the second user perceives the first utterance as being spoken from his or her right hand side and the second utterance as being spoken from his or her left hand side.

In optional step 216 (illustrated in phantom), the processing system may present a second utterance of the first user to the second user, where a directionality associated with the presentation of the second utterance is different from the directionality associated with the first utterance. In one example, the second utterance is uttered by the first user after the first utterance (i.e., after the presentation of the first utterance as described in connection with step 210).

In one example, the directionality associated with the second utterance may be changed in response to movements of at least one of: the first user or the second user. For instance, the first user may move from behind the second user to next to the second user in the extended reality environment, or the second user may lean in closer to the first user in the extended reality environment in order to better hear the first user.

However, in other examples, the directionality associated with the second utterance may be changed in response to other needs of the second user within the extended reality environment. For instance, the first user's voice (and utterances) may be associated with an object of interest within the extended reality environment. Thus, instead of the first user's utterances being presented in a manner that causes the second user to perceive the first user's relative spatial position, the first user's utterances may be presented in a manner that causes the second user to perceive the first user's voice as always emanating from the object of interest. As an example, the first user may be giving the second user directions to navigate to a point of interest, such as a landmark within a city (where the extended reality environment may comprise a virtual tour of the city). In this case, where the second utterance comprises an instruction to, for example, enter a specific subway station, the second utterance could be presented in a manner that causes the second user to perceive the first user's voice as emanating from the location of the specific subway station in the extended reality environment. Where the object of interest comprises an object for which many objects of the same class are present in the extended reality environment (e.g., multiple subway trains on a platform), different users' voices and utterances may be associated with different objects (e.g., the first user's voice may be associated with a first subway train, while a third user's voice may be associated with a second subway train, etc.).

A similar approach could assist a user who is lost in a crowd. For instance, by presenting the second utterance as coming from a specific direction relative to the second user, the second user could be guided out of the crowd or to a specific location (e.g., by following the voice). For instance, if the extended reality environment comprises a crowded concert venue for a virtual concert, the second utterance (and subsequent utterances of the first user) could be presented in a manner that guides the second user to the proper seat location within the concert venue or out of the concert venue.

In optional step 218 (illustrated on phantom), processing system may present a spatial awareness warning to the second user, based on the location and the directional position of the second user. For instance, if the processing system detects that the second user may be about to encounter an obstacle or hazard in the second user's physical environment, the processing system may generate a synthesized speech warning for presentation to the second user alerting the second user to the obstacle or hazard. As an example, if the processing system detects that the second user is walking very close to the edge of a subway platform in the second user's physical environment, the processing system may present an alert with a directionality that causes the second user to perceive the alert as coming from the edge of the platform. The alert could also be presented as emanating from an object or avatar in the extended reality environment (e.g., an avatar that appears on the edge of the platform warning the user to step back, or a bench in the middle of the subway platform asking the user to move closer).

In optional step 220 (illustrated in phantom), the processing system may update the locations and the directional positions of the members of the communication group based on contextual clues. In one example, the updating may comprise providing a non-audible feedback to one or more members of the communication group to indicate a member who is currently speaking. For instance, if the first user is currently speaking, a haptic or visual feedback (e.g., vibration, visual marker, or the like) could be presented with a directionality that is associated with the first user's location and directional position relative to the other members of the communication group.

The updated locations and the directional positions may also be used to preserve the privacy of conversations between members of the communication group. For instance, if the first user is gazing at the second user while speaking an utterance, this may indicate that the utterance is meant for the second user but not necessarily for other members of the communication group (this determination could also be made based on the context of the utterance). In this case, the utterance could be presented only to the second user and not to the other members of the communication group (e.g., muting or lowering the volume of the audio devices of other users).

The method 200 may end in step 222. However, in some examples, steps of the method may be repeated before a signal is received that indicates that the members of the communication group wish for the processing system to cease presenting the extended reality environment (e.g., before the users power down their endpoint devices, speak a command or press a button to exit the extended reality environment, or the like). For instance, the processing system may continuously track and update the locations and directional positions of the members of the communication group, determine the directionality of additional utterances made by members of the communication group, or the like.

Although not expressly specified above, one or more steps of the method 200 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIG. 2 that recite a determining operation or involve a decision do not necessarily require that both branches of the determining operation be practiced. In other words, one of the branches of the determining operation can be deemed as an optional step. However, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the examples of the present disclosure.

Thus, examples of the present disclosure improve the sense of immersion in extended reality environments by providing spatial awareness of a user's communication points (e.g., specific people on the user's left or right) and presenting audio in a manner consistent with this spatial awareness. Examples of the present disclosure may also interface with public safety technology to provide assistance in the event of an emergency (e.g., evacuation routes, emergency alerts, etc.). Moreover, examples of the present disclosure can control the presentation of audio in a manner that preserves the privacy of communications across changing physical locations or environments.

In other examples, an orientation of an extended reality environment may help to improve a user's cognition or comfort in the extended reality environment. For example, if a user is participating in an intense visual or aural immersion while travelling in a high inertia environment (e.g., a high speed train or a car making fast turns) or a zero-gravity environment (e.g., floating or spinning in a spacecraft), then examples of the present disclosure may manipulate interactions from other users in the immersion to better orient the user who is in the high inertia or zero-gravity environment (e.g., to avoid sickness or confusion). In further examples, predicted inertial changes (e.g., an autonomous car going into a hard turn in five seconds) may be leveraged to preemptively reorient immersive interactions from other users.

The ability to use spatial directions and contextual engagements to manage personal immersions may enhance a plurality of immersive applications. For instance, in one example, examples of the present disclosure may be used to provide a spatially distributed immersion (without the need for smart glasses or VR goggles) for a plurality of users who perform the same role within a company and are sharing a commuting space (e.g., a bus, a train, a carpool). In this case, examples of the present disclosure could be used to orient the multiple users to consistent relative positioning in an extended reality space (e.g., left, right, front, etc.). Directional conversations could be transmitted or blocked to the appropriate parties (e.g., if one user wants to invite another user to join them for lunch, without inviting the entire group of users).

Examples of the present disclosure could also be used to moderate physical and/or extended reality environments (e.g., provide parental controls or controls to avoid undesired content). For instance, if a user is physically present at his or her child's baseball game but is having a conversation with a friend via an extended reality environment, the directionality of the utterances exchanged between the user and the friend could be controlled to maintain the privacy of the conversation, prevent children from hearing objectionable language, or the like.

Examples of the present disclosure could also be used to detect and filter directional audio that may be loud, bothersome to a sensitive user, or disruptive to an immersive experience. For instance, noise relating to traffic, construction, lawn mowers, vacuum cleaners, or explicit content could be reduced in volume or filtered out completely. This approach could be applied on an individual level (e.g., only applied for the audio of members of communication group who have requested filtering). Filtering could be applied in response to an explicit request from a user, or in response to the detection of user discomfort (e.g., images, utterances, biometric data, or the like from which user discomfort can be inferred, such as an image of the user covering his or her ears or wincing in response to a loud noise).

Further examples of the present disclosure could be used to switch directionality in multi-party conversations. For instance, where members of communication group enter a subway station in their physical environment, a "tunnel" could be established between the members even when the members split up within the subway station. If a user is carrying on two different discussions with two different contexts (e.g., a first discussion with a first friend related to a homework assignment and a second discussion with a second friend related to plans for the weekend), examples of the present disclosure may detect the different conversational contexts (or track the user's gaze) and split the directionality of the two discussions accordingly (e.g., the first friend to the user's right and the second friend to the user's left).

Further examples of the present disclosure could be used to enhance public safety applications. For instance, if the user is standing on a subway platform and an announcement is made that a train is running late, the announcement may be routed to the extended reality environment to ensure that the user is aware of the announcement.

Examples of the present disclosure could also be extended to integrate additional contextually appropriate visuals into the extended reality environment and to associate the visuals with the appropriate user/speaker. For instance if a user in a communication group is speaking and sharing his or her screen at the same time, the shared screen could be placed in a location on the displays of the other users that corresponds to the speaker user's position.

Further examples of the present disclosure could include the creation of temporary or ephemeral metaverse objects during conversations (e.g., animations of laughing faces, flashing warning signs, or the like), where the metaverse objects can be placed in areas of the displays that are associated with specific members of the communication group. These metaverse objects could be used to convey non-verbal gestures, opinions, reactions, and the like.

Further examples of the present disclosure could include the creation of metaverse markers from general metadata of a speaking user, where the metaverse markers could be placed in an area of the display associated with the speaking user. The general metadata of the speaking user could include, for example, the connectivity strength of the speaking user's user endpoint device, the security of the connection of the speaking user's user endpoint device, and/or other data. For instance, a metaverse marker could comprise a flashing warning sign if the speaking user is connecting to the extended reality environment via an insecure channel, a blue light illuminating the speaking user if communications with the speaking user are private, or the like.

Further examples of the present disclosure could support novel social media experiences in which users are present in a common physical space, but can discover new conversations of interest that may be taking place among other users in the physical space (where the other users may be participating in an extended reality environment). For instance, users may meet in the physical or extended reality space and be dynamically organized into groups as conversations occur, such that the final result is a plurality of physically grouped related conversations (e.g., clustering by physically moving users who are conversing with each other).

FIG. 3 depicts a high-level block diagram of a computing device specifically programmed to perform the functions described herein. For example, any one or more components or devices illustrated in FIG. 1 or described in connection with the method 200 may be implemented as the system 300. For instance, a server (such as might be used to perform the method 200) could be implemented as illustrated in FIG. 3.

As depicted in FIG. 3, the system 300 comprises a hardware processor element 302, a memory 304, a module 305 for managing personal immersions in extended reality environments using spatial directions and contextual engagements, and various input/output (I/O) devices 306.

The hardware processor 302 may comprise, for example, a microprocessor, a central processing unit (CPU), or the like. The memory 304 may comprise, for example, random access memory (RAM), read only memory (ROM), a disk drive, an optical drive, a magnetic drive, and/or a Universal Serial Bus (USB) drive. The module 305 for managing personal immersions in extended reality environments using spatial directions and contextual engagements may include circuitry and/or logic for performing special purpose functions relating to the operation of an XR server. The input/output devices 306 may include, for example, a camera, a video camera, storage devices (including but not limited to, a tape drive, a floppy drive, a hard disk drive or a compact disk drive), a receiver, a transmitter, a speaker, a display, a speech synthesizer, an output port, and a user input device (such as a keyboard, a keypad, a mouse, and the like), or a sensor.

Although only one processor element is shown, it should be noted that the computer may employ a plurality of processor elements. Furthermore, although only one computer is shown in the Figure, if the method(s) as discussed above is implemented in a distributed or parallel manner for a particular illustrative example, i.e., the steps of the above method(s) or the entire method(s) are implemented across multiple or parallel computers, then the computer of this Figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 305 for managing personal immersions in extended reality environments using spatial directions and contextual engagements (e.g., a software program comprising computer-executable instructions) can be loaded into memory 304 and executed by hardware processor element 302 to implement the steps, functions or operations as discussed above in connection with the example method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 305 for managing personal immersions in extended reality environments using spatial directions and contextual engagements (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method comprising:
    establishing, by a processing system including at least one processor, a communication group including at least three users of an extended reality environment as members;
    tracking, by the processing system, locations and directional positions of the members of the communication group within the extended reality environment and within physical environments of the members;
    determining, by the processing system, that a second user of the at least three users is an intended recipient of a first utterance made by a first user of the at least three users;
    presenting, by the processing system, the first utterance to the second user, where a directionality associated with a presentation of the first utterance is based on a location and a directional position of the first user relative to the second user; and
    presenting, by the processing system, a spatial awareness warning to the second user, based on the location and the directional position of the second user.

2. The method of claim 1, further comprising:
    determining, by the processing system, that the second user is an intended recipient of a second utterance made by a third user of the at least three users; and
    presenting, by the processing system, the second utterance to the second user, where a directionality associated with a presentation of the second utterance is based on a location and a directional position of the third user relative to the second user.

3. The method of claim 2, wherein the third user is different from the first user, and the location and the directional position of the third user relative to the second user are different from the location and the directional position of the first user relative to the second user.

4. The method of claim 3, wherein the presenting the second utterance comprises playing the second utterance in a manner that causes the second user to perceive that the third user is positioned in a specific location relative to the second user.

5. The method of claim 1, further comprising:
    presenting, by the processing system, a second utterance of the first user to the second user, where a directionality associated with the presentation of the second utterance is different from the directionality associated with the first utterance.

6. The method of claim 5, wherein the directionality associated with the presentation of the second utterance is different from the directionality associated with the first utterance due to at least one of: a movement of the first user subsequent to presentation of the first utterance or a movement of the second user subsequent to presentation of the first utterance.

7. The method of claim 1, further comprising:
    updating, by the processing system, the locations and the directional positions of the members of the communication group based on at least one contextual clue.

8. The method of claim 7, wherein the updating comprises providing a non-audible feedback to one or more of the members of the communication group to indicate a member of the communication group who is currently speaking.

9. The method of claim 1, wherein the establishing is performed through at least one of: an observation of a direct communication between the at least three users, an observation of gestures of the at least three users, an observation of automated calendars of the at least three users, an observation that the at least three users are within proximity of each other, or an observation of a split in an existing communication group including the at least three users.

10. The method of claim 1, wherein the establishing includes selecting one or more playback devices through which communications between members of the communication group are to be presented.

11. The method of claim 1, wherein the tracking is based on data received from ambient sensors located in the physical environments in which the at least three users are observed.

12. The method of claim 1, wherein the tracking is based on data received from user endpoint devices used by the at least three users.

13. The method of claim 1, wherein the determining is based on a context of the first utterance.

14. The method of claim 1, wherein the presenting comprises controlling an ambient audio device in a physical environment of the second user to present the first utterance.

15. The method of claim 1, wherein the presenting comprises controlling a user endpoint device of the second user to present the first utterance.

16. The method of claim 1, wherein the presenting comprises playing the first utterance in a manner that causes the second user to perceive that the first user is positioned in a specific location relative to the second user.

17. The method of claim 1, wherein the spatial awareness warning comprises a synthesized speech.

18. The method of claim 1, wherein the spatial awareness warning is presented as emanating from an object or an avatar in the extended reality environment.

19. A non-transitory computer-readable medium storing instructions which, when executed by a processing system including at least one processor, cause the processing system to perform operations, the operations comprising:
- establishing a communication group including at least three users of an extended reality environment as members;
- tracking locations and directional positions of the members of the communication group within the extended reality environment and within physical environments of the members;
- determining that a second user of the at least three users is an intended recipient of a first utterance made by a first user of the at least three users;
- presenting the first utterance to the second user, where a directionality associated with a presentation of the first utterance is based on a location and a directional position of the first user relative to the second user; and
- presenting a spatial awareness warning to the second user, based on the location and the directional position of the second user.

20. A device comprising:
a processing system including at least one processor; and
a computer-readable medium storing instructions which, when executed by the processing system, cause the processing system to perform operations, the operations comprising:
- establishing a communication group including at least three users of an extended reality environment as members;
- tracking locations and directional positions of the members of the communication group within the extended reality environment and within physical environments of the members;
- determining that a second user of the at least three users is an intended recipient of a first utterance made by a first user of the at least three users;
- presenting the first utterance to the second user, where a directionality associated with a presentation of the first utterance is based on a location and a directional position of the first user relative to the second user; and
- presenting a spatial awareness warning to the second user, based on the location and the directional position of the second user.

* * * * *